Aug. 16, 1949.  O. J. BRATZ  2,479,096
TURNBUCKLE
Filed Dec. 5, 1945
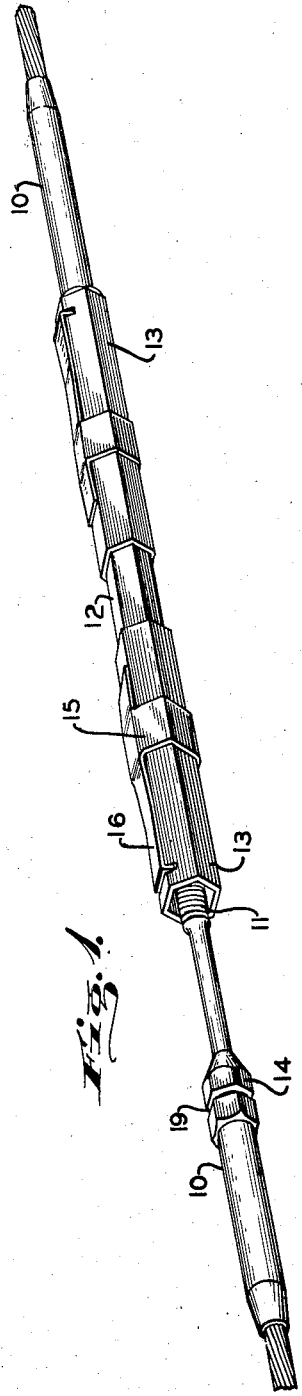
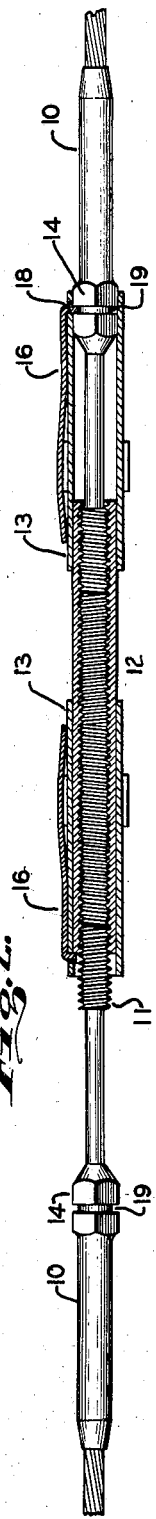
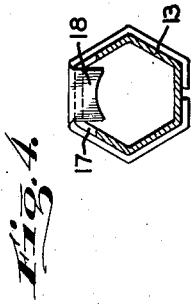
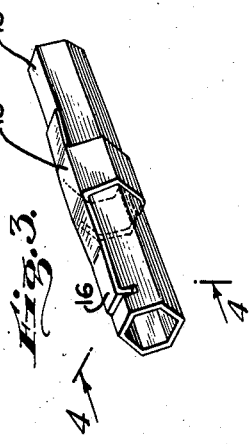
INVENTOR
OTTO J. BRATZ
BY
ATTORNEY Patented Aug. 16, 1949

2,479,096

UNITED STATES PATENT OFFICE 2,479,096

TURNBUCKLE

Otto J. Bratz, Adrian, Mich., assignor to American Chain & Cable Company, Inc., Bridgeport, Conn., a corporation of New York Application December 5, 1945, Serial No. 632,845

5 Claims. (Cl. 287—60)

1

This invention relates to turnbuckles of a type utilized mainly in aircraft construction for adjusting the tension on long flexible members such as control cables.

It is an object of the present invention to provide a turnbuckle with a positive lock which will not change its adjustment under vibration and varying tension on the cable to which it is secured.

It is a further object of the present invention to provide a turnbuckle which will not lock unless a sufficient number of its threads are in engagement, as required by safety regulations promulgated by various bodies.

It is a further object of the present invention to provide a turnbuckle with a lock which requires the minimum number of tools for adjustment in operation.

It is a further object of the present invention to provide a turnbuckle and a lock therefor which are sufficiently light to render them practicable for employment in aircraft.

Referring now to the drawings—

Fig. 1 is a general view showing a turnbuckle with one end unlocked and the other end locked for the purpose of illustration;

Fig. 2 is a section taken along the axis of the turnbuckle shown in Fig. 1;

Fig. 3 is a detail of the sleeve employed; and

Fig. 4 is a section taken at plane 4—4 of Fig. 3.

The turnbuckle shown comprises a pair of members 10, which are provided with a bore at each end for reception of the cable. After insertion of the cable in the bore, the material of which the members 10 is formed is swaged down to hold it securely in place. The opposite end of each end member is provided with screw threads 11, these being right and left in a pair, as is customary in turnbuckles. The body of the turnbuckle 12 is simply a hexagonal rod with a bore along its axis and threads cut in each end to correspond to the threads on the end members 10.

In order to lock the turnbuckle against rotation after adjustment, a pair of sleeves 13 is provided. Each of these sleeves fits the body of the turnbuckle, and a hexagonal portion 14 formed on each of the end members 10. It can be seen that sliding a hexagonal sleeve over the hexagonal portion 14 of each of the end members securely locks the turnbuckle against relative rotation of the parts.

It is necessary to provide a positive means for preventing endwise displacement of the sleeves 13 when the turnbuckle is in its locked position. This is done in the present instance by the pro-

2 vision of a catch member 15, shown in detail in Fig. 3.

This consists simply of a band which is formed to engage the outside of the sleeve 13, having a long resilient spring lever 16 projecting from one end. As shown, the end of this lever is bent at right angles and passes through a slot 17 in the sleeve 13. As shown most clearly in Fig. 2, the downwardly bent portion 18 of the catch engages a circumferential groove 19 formed in the hexagonal portion 14 of the end member 10.

The spring member has been shown as closely engaging the outside of the sleeve. This need not be so, although, if it is desired to make it necessary to utilize a pointed instrument to lift the spring lever, such a construction may be employed. This would make unauthorized changes in the adjustment of the turnbuckle less likely to occur. If it is desired, a small slot can be milled in the sleeve, for the insertion of a screwdriver, thus rendering lifting of the lever relatively simple. It will be understood that, ordinarily, the projecting portion 18 of the lever rides up on the conical surface of the end members when locking, and drops into the groove 19, so no tools are necessary for locking the device.

If an end member is in such a position that an insufficiency of threads is in engagement, sliding the sleeve 13 to engage the catch in the groove in the end member will result in the inner end of the sleeve clearing the body of the turnbuckle. This will be immediately apparent, as the inspector need only grasp the sleeve and the body and attempt to turn them relative to each other. If there is any motion possible, too few threads are engaged. Furthermore, the space between the end of the sleeve and the body of the turnbuckle will be visible, thus providing an additional check.

It is to be understood that this description is not intended to be limitative of the present invention but illustrative only, and that the invention may be best comprehended from the appended claims.

I claim:

1. In a turnbuckle, a body member and an end member threadedly engaging each other, each of said members including a non-cylindrical portion, a sleeve having an opening in its wall and mounted for sliding movement over said non-cylindrical portions and adapted to prevent rotation of said members relative to each other, one of said members having a depression in its surface, and spring means mounted on said sleeve extending through said opening and engageable with said depression to prevent sliding of said sleeve.

2. In a turnbuckle, a body member and an end member threadedly engaging each other, said body member having a non-cylindrical portion, and said end member having a non-cylindrical portion of greater cross-sectional area than the rest of said end member and having a depression in its surface, the end member having a tapered portion on an end of the non-cylindrical portion, a sleeve having an opening in its wall and mounted for sliding movement over said non-cylindrical portions, adapted to prevent rotation of said members relative to each other, and spring means mounted on said sleeve extending through said opening and engageable with said depression to prevent sliding of said sleeve.

3. In a turnbuckle, a body member and an end member, said end member being threaded into said body member, said body member having a non-cylindrical portion, and said end member having a non-cylindrical portion of substantially the same cross-section as that of the body member, the non-cylindrical portion of the end member having a circumferential groove in its surface, a sleeve having an opening in its wall and mounted for sliding movement over said non-cylindrical portions, adapted to prevent rotation of said members relative to each other, and spring means mounted on said sleeve extending through said opening and engageable with said groove to prevent sliding of said sleeve.

4. In a turnbuckle, a body member and an end member threadedly engaging each other, each of said members including a non-cylindrical portion, a sleeve having an opening in its wall and mounted for sliding movement over said non-cylindrical portions and adapted to prevent rotation of said members relative to each other, one of said members having a depression in its surface, and spring means mounted on said sleeve extending through said opening and engageable with said depression to prevent sliding of said sleeve, the distance between the projecting portion of the spring means and the opposite end of the sleeve being no greater than the distance between the depression in one member and the nearest edge of the non-cylindrical portion of the other member when the members have a minimum permissible threaded engagement.

5. In a turnbuckle, a body member and an end member threadedly engaging each other, each of said members including a non-cylindrical portion, one of said members having a depression in its non-cylindrical portion, a sleeve mounted for sliding movement on said non-cylindrical portions and having an opening therein and adapted to prevent rotation of said members relative to each other, and a spring member comprising a portion embracing the sleeve and a leaf projecting from said portion and lying along the sleeve, a portion on said leaf projecting through said opening to engage said depression.

OTTO J. BRATZ.

REFERENCES CITED

The following references are of record in the file of this patent:

UNITED STATES PATENTS

| Number | Name | Date |
| --- | --- | --- |
| 2,295,357 | Ryan et al. | Sept. 8, 1942 |
| 2,398,160 | Silver | Apr. 9, 1946 |